United States Patent
Spies (10) Patent No.: US 7,668,361 B2
(45) Date of Patent: Feb. 23, 2010

(54) SYSTEM AND METHOD FOR THE CORRECTION OF TEMPORAL ARTIFACTS IN TOMOGRAPHIC IMAGES

(75) Inventor: Lothar Spies, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 656 days.

(21) Appl. No.: 11/571,659

(22) PCT Filed: Jun. 29, 2005

(86) PCT No.: PCT/IB2005/052160

§ 371 (c)(1),
(2), (4) Date: Jan. 5, 2007

(87) PCT Pub. No.: WO2006/006100

PCT Pub. Date: Jan. 19, 2006

(65) Prior Publication Data

US 2008/0044076 A1 Feb. 21, 2008

(30) Foreign Application Priority Data

Jul. 7, 2004 (EP) .................................. 04103223

(51) Int. Cl.
*G06K 9/00* (2006.01)
(52) U.S. Cl. .................. 382/132; 382/130; 382/312; 378/91; 378/207; 378/4; 378/8; 378/210; 700/28; 700/29; 700/213; 700/240
(58) Field of Classification Search .............. 382/132, 382/312; 378/91, 207, 19, 210, 4, 8; 700/28, 700/29, 31, 33, 72, 77, 213, 240; 702/50, 702/55, 104
See application file for complete search history.

(56) References Cited

U.S. PATENT DOCUMENTS 5,214,578 A 5/1993 Cornuejols et al.

(Continued)

FOREIGN PATENT DOCUMENTS

WO 03017842 A1 3/2003

OTHER PUBLICATIONS

"Investigation of a solid-state detector for advanced computed tomography" IEEE Sep. 2000 ; Jiang Hsieh.*

(Continued)

*Primary Examiner*—Wesley Tucker
*Assistant Examiner*—Nancy Bitar (57) ABSTRACT

The invention relates to an imaging system for imaging an object (4), said imaging system comprising a detection unit (3) for consecutively acquiring projection data sets ($P_i$) of the object (4), said detection unit (3) having a temporal response function that is characterized by at least a time constant ($\tau$), a rotation unit that, while the projection data sets ($P_i$) are being acquired, moves the detection unit (3) around the object (4) with an essentially constant angular velocity ($\omega$), a reconstruction unit (9) for computing an image data set (13) of the object (4) from the projection data sets ($P_i$), and a filter unit (10) that, in an active state, applies a filter (f) on the image data set (13) to compute a correction, which filter acts as a derivative on the perturbed image, essentially in a direction corresponding to the direction of the angular velocity, is essentially proportional to the time constant ($\tau$) and is essentially proportional to the angular velocity ($\omega$), said filter unit (10) being arranged to subtract the correction from the image data set (13).

6 Claims, 4 Drawing Sheets

U.S. PATENT DOCUMENTS

| | | | | |
|---|---|---|---|---|
| 5,249,123 | A | * | 9/1993 | Hsieh ........................ 378/19 |
| 5,265,013 | A | | 11/1993 | King et al. |
| 5,359,638 | A | * | 10/1994 | Hsieh et al. .................... 378/4 |
| 5,517,544 | A | | 5/1996 | Levinson |
| 7,582,860 | B2 | * | 9/2009 | Kusunoki ................ 250/252.1 |
| 7,599,541 | B2 | * | 10/2009 | Hayashida .................. 382/132 |
| 2003/0072417 | A1 | | 4/2003 | Kaufhold et al. |

OTHER PUBLICATIONS

Hsieh, J., et al.; Investigation of a Solid-State Detector for Advanced Computed Tomography; 2000; IEEE Transactions on Medical Imaging; 19(9)930-940.

Overdick, M., et al.; Temporal Artefacts in Flat Dynamic X-ray Detectors; 2001; Proc. of SPIE; vol. 4320; pp. 47-58.

Siewerdsen, J. H., et al.; A ghost story: Spatio-temporal response characteristics of an indirect-detection flat-panel imager; 1999; Med. Phys. 26(8)1624-1641.

\* cited by examiner

SYSTEM AND METHOD FOR THE CORRECTION OF TEMPORAL ARTIFACTS IN TOMOGRAPHIC IMAGES

The present invention relates to a system and a method for correcting for temporal artifacts occurring in Computed Tomography (CT) or similar imaging techniques.

In a medical X-ray examination of an object, an X-ray source emits X-radiation that is collimated by a collimation unit. The X-radiation traverses the object that is being examined and the transmitted X-radiation is detected on an X-ray sensitive detector. Acquisition of transmission data by use of the X-ray sensitive detector results in an X-ray projection image. If such a medical X-ray examination includes a series of consecutive acquisitions, the later acquired X-ray images may be degraded by a temporal behavior of the X-ray detector, where temporal behavior means that the (multi-step process of the) conversion of the received X-ray signal into electrical charges does not happen instantaneously but is spread over time as is described in the following.

A typical X-ray detector element comprises a converter layer (also called scintillator) that converts X-ray quanta into optical light quanta and a photodiode for converting the optical quanta into electrical charges. When irradiated by a short X-ray pulse, such a detector element shows a signal response that can be modeled by one or a sum of exponential decay curves each characterized by a decay time constant. E.g. if in a consecutive acquisition the projection of the examined object is larger than in the previous acquisition, then a previously fully irradiated area is exposed to only a reduced X-ray intensity due to the attenuation by the object. A residual signal is detected in the previously non-shaded detector area that originates from the delayed time response of the detector elements in this area. This residual signal degrades contrast resolution and shifts the mean signal level to a higher value than it actually would be without degradation. Similarly, for all signal intensities varying between a previous and a consecutive acquisition such a signal blur occurs, but the larger the difference the larger the effect. If the consecutive acquisitions are used for a tomographic reconstruction of a cross-sectional image of the examined object, the temporal response of the detector leads to temporal artifacts in the reconstructed image. Tomographic images are generated in Computed Tomography (CT) scanners or in other devices where the X-ray source and/or the detector are arranged to rotate around the object so as to acquire projection images from different directions so that a cross-sectional image or a volume image of the object can be reconstructed.

From U.S. Pat. No. 5,249,129 it is known to correct for the temporal response of a CT detector by applying a recursive filter on the projection images and to use the filtered projection images to reconstruct a cross-sectional image of the object.

It is an object of the present invention to provide a system and a method for an alternative concept of temporal artifact correction.

The object is achieved by an imaging system for imaging an object, said imaging system comprising a detection unit for consecutively acquiring projection data sets of the object, said detection unit having a temporal response function that is characterized by at least a time constant, a rotation unit that, while the projection data sets are being acquired, moves the detection unit around the object with an essentially constant angular velocity, a reconstruction unit for computing an image data set of the object from the projection data sets, and a filter unit that, in an active state, applies a filter on the image data set to compute a correction, wherein the filter acts essentially as a derivative on the perturbed image, in a direction corresponding to the direction of the angular velocity, is essentially proportional to the time constant and is essentially proportional to the angular velocity, said filter unit being arranged to subtract the correction from the image data set.

The described system applies a filter on the reconstructed image. This allows the filter unit to be remote from the detection unit itself. Images can be corrected while new images are already being acquired by the detection unit. By applying the correction on the reconstructed image also the number of correction operations is reduced. The correction itself also becomes independent of the sinogram data (the projection images). It is furthermore also possible to apply a correction without knowledge of the filter parameters. The correction could be iterated until the corrected image gives the best visual results as judged by a human inspector or until a given sharpness is reached.

The object is also achieved by a method of correcting for temporal artifacts in an image data set of an object, comprising the steps of consecutively acquiring projection data sets ($P_i$) at different angular positions around the object, where the change in the angular position occurs with essentially a constant angular velocity, said projection data sets being deteriorated by a temporal response function which is characterized by at least one time constant, determination of the image data set from the projection data sets by means of a reconstruction operation, applying a filter on the image data set to compute a correction, wherein the filter acts essentially as a derivative on the perturbed image, in a direction corresponding to the direction of the angular velocity, is essentially proportional to the time constant and is essentially proportional to the angular velocity, said filter unit being arranged to subtract the correction from the image data set.

The invention further relates to a computer program product, which contains the software that can be downloaded into a processing device being part of the inventive imaging system and which then performs the steps according to the method described above.

These and other aspects of the invention will be apparent from and elucidated with reference to the embodiments described hereinafter and with reference to the Figures.

Figure 1:
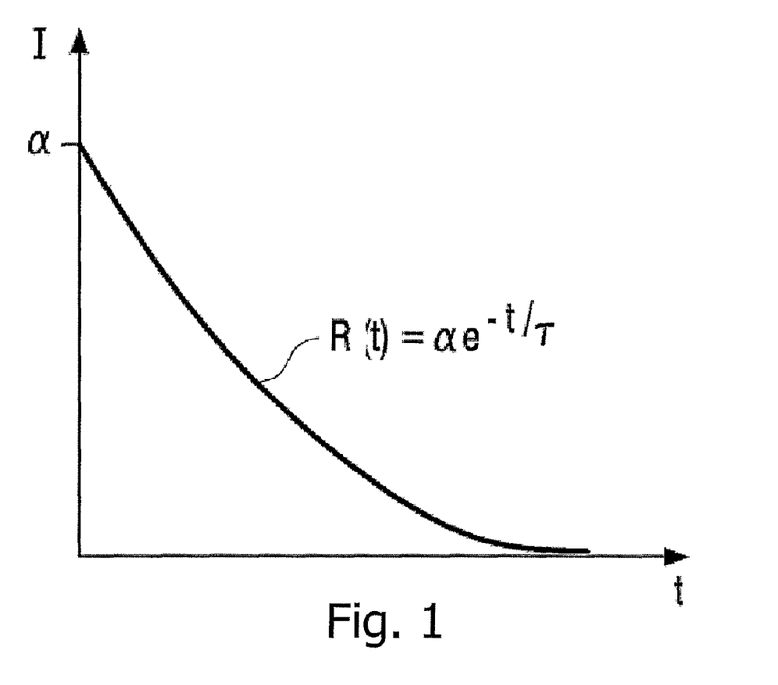
FIG. 1 is a schematic depiction of a temporal response function.

FIG. 1 shows an exemplary temporal response function $R(t)=\alpha\exp(-t/\tau)$ that is characterized by a time constant $\tau$. Such a temporal response function describes the behavior of a system after excitation by an impulse function (Dirac delta function). If the system is a detection unit for detecting radiation and generating an electronic signal indicative of the intensity of the radiation, the temporal response function leads to a temporally deteriorated electronic signal. The conversion from radiation into an electronic signal is delayed. Assuming a radiation signal s(u,t), where u is a position parameter and t is the time, then the electronic signal $\bar{s}$ generated by the detection unit is given by $$\bar{s}(u, t) = \chi \int_0^t dt' s(u, t') R(t - t'), \quad (1)$$

where $\chi$ is a proportionality constant. If the detection unit is an X-ray detector that converts impinging X-rays into an electronic signal indicative of the intensity of the X-rays by first converting the X-rays into optical quanta in a scintillator layer and then the optical quanta into electrical charges by photodiodes, as is known in the art, the temporal response function can be caused by the scintillator layer and/or by the photodiodes. The temporal response function of the scintillator layer is usually referred to as scintillator afterglow and the temporal response function of the photodiode is usually referred to as photodiode lag. These effects are e.g. described in J. H. Siewerdsen and D. A. Jaffray, "A ghost story: Spatio temporal response characteristics of an indirect-detection flat-panel imager", Med. Phys 26 (1999) 1624-1641.

Figure 2:
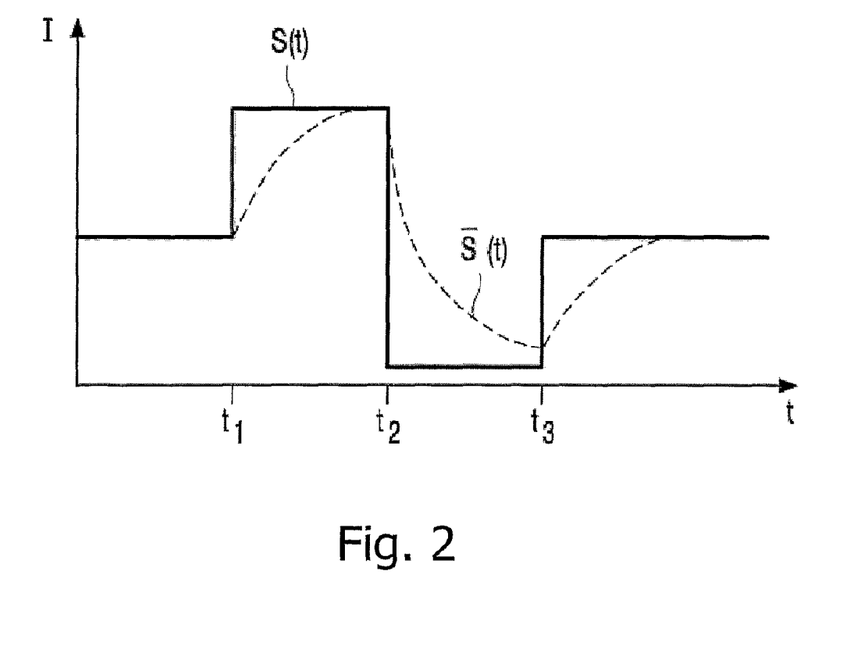
FIG. 2 is a schematic depiction of the effect of a temporal response function on an intensity signal.

FIG. 2 depicts the effect of a temporal response function on an input signal $s(u=u_0,t)$ (full line) that represents e.g. the X-ray intensity. The resulting temporally deteriorated output signal $\bar{s}(u=u_0,t)$ (dashed line), representing e.g. the electronic signal generated by the detection unit, is normalized to the input signal ($\chi=1$) for the sake of clarity. In FIG. 2, I indicates the intensity in arbitrary units. The input signal s(u,t) is assumed to have a certain start intensity level that suddenly increases to a higher intensity value at $t=t_1$ and also suddenly drops to a lower intensity at $t=t_2$ and again suddenly rises to the start intensity at $t=t_3$. Prior to $t_1$ the temporal response is assumed to be in an equilibrium state as the signal intensity is assumed to have been unchanged for a time period $\Delta T$ long with respect to the characterizing time constant $\tau$ (e.g. $\Delta T=100$ ms$>>\tau=1$ ms). As a result, the delay in the response to a current input signal is balanced by residual signals from earlier input signals, which means that the output signal follows the input signal as can be seen from FIG. 2. At $t_1$ the input signal intensity suddenly rises to a higher intensity value. Due to the delay introduced by the temporal response function R(t), the output signal follows the input signal according to equation 1. This is schematically indicated in FIG. 2 by the dashed line. At $t_2$ the input signal intensity suddenly drops to an intensity value below the start intensity. The output signal again shows a temporal delay according to equation 1. At $t_3$ the input signal intensity again suddenly rises to its original start intensity level. At time $t_3$ the output signal (dashed line) has not yet reached the input signal level during time interval ]$t_2,t_3$]. The output signal then again rises until it reaches the intensity level of the input signal. It is clear from this schematic depiction that the temporal response function smoothes the input signal in the time direction. If input signal changes occur with a high temporal frequency or with a high amplitude as shown in FIG. 2, the fast changes and the large changes are smoothed by the temporal response function.

Figure 3:
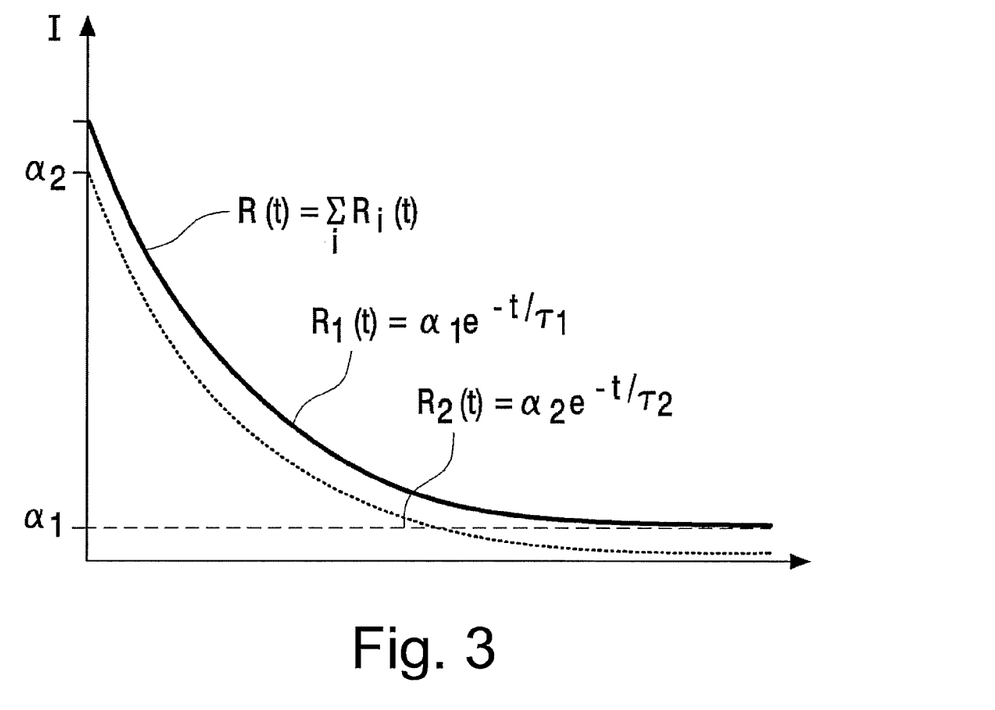
FIG. 3 is a schematic depiction of a temporal response function that is composed of two temporal response functions having different time constants.

FIG. 3 shows an exemplary temporal response function that is characterized by two characterizing time constants $\tau_1$ and $\tau_2$. The first time constant $\tau_1$ represents a fast decaying part of the temporal behavior and the second time constant $\tau_2$ represents a slow decaying part of the temporal behavior. In practice it has been shown that the temporal behavior of a typical X-ray detector element can be described by three or four characterizing time constants. For certain purposes, or when a certain residual artifact level is allowed after correction, the temporal behavior may nevertheless be described by one or two constants or one may want to use even more time constants.

A correction for the deterioration caused by temporal response functions on the output signal is known in the art, e.g. as described in Jiang Hsieh, IEEE Transactions on Medical Imaging, Vol. 19, No. 9, September 2000, p. 930-940, where recursive time filters are applied directly on the output signal.

Figure 4:
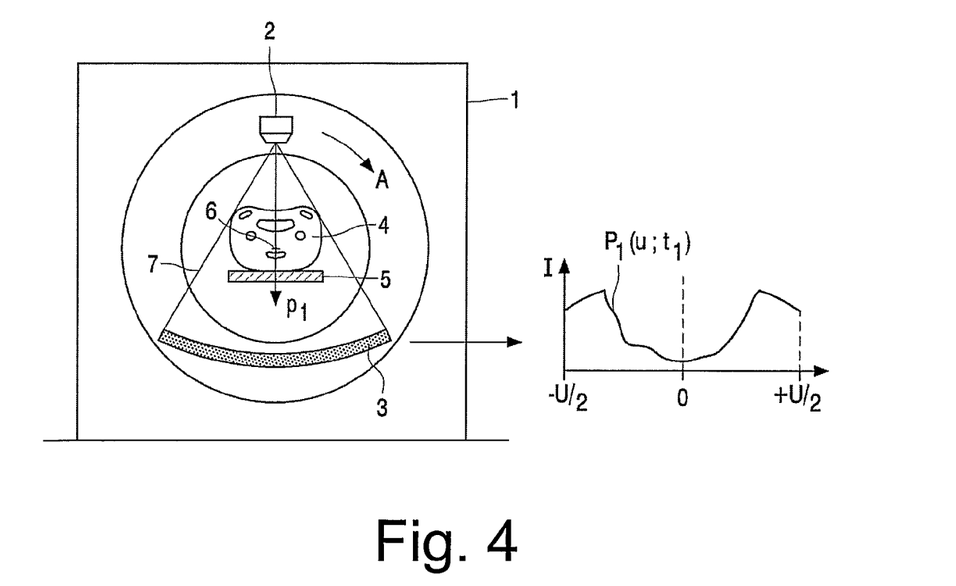
FIG. 4 is a depiction of an exemplary imaging device used to acquire projection data sets of an object shown at a first time instant and the resulting projection data set.

FIG. 4 shows an exemplary imaging device 1 (in the described embodiment this is a CT scanner) that has a stationary part and a rotating part. On the rotating part an X-ray source 2 and a detection unit 3 (in the described embodiment this detection unit is an X-ray detector) are fixedly mounted. X-ray source 2 and detection unit 3 rotate around an object 4 that is disposed on a patient support 5. The X-ray source 2 emits X-rays that are formed into a fan beam 7 by a beam former or collimator device (not shown). The object 4 is positioned inside the fan beam 7 and is irradiated by X-rays. The transmitted X-rays are measured by the detection unit 3 and are converted into electronic signals indicative of the X-ray intensity impinging on the detection unit. While rotating into direction A, the detection unit 3 is consecutively read out. In each read-out cycle, a projection data set derived from the electronic signals is read out from the detection unit 3. If the detection unit is a single-line detector having a number of D detector elements, a projection data set is a series of D projection values. In the shown embodiment, the projection direction of a projection data set is the direction defined by a line originating in the focal spot of the X-ray source 2 and going through the center of rotation 6 of the imaging device 1. In FIG. 4 the projection direction $p_1$ is shown for the projection data set $P_1$ that is sketched on the right-hand side of FIG. 4. The projection data set $P_1$ measured at time $t_1$ is shown as measured intensity values over the position u on the detection unit 3. The center position on the detection unit 3 has the value u=0 and the border values are at positions u=−U/2 and u=U/2, respectively. The total length of the detection unit 3 then is U.

Figure 5:
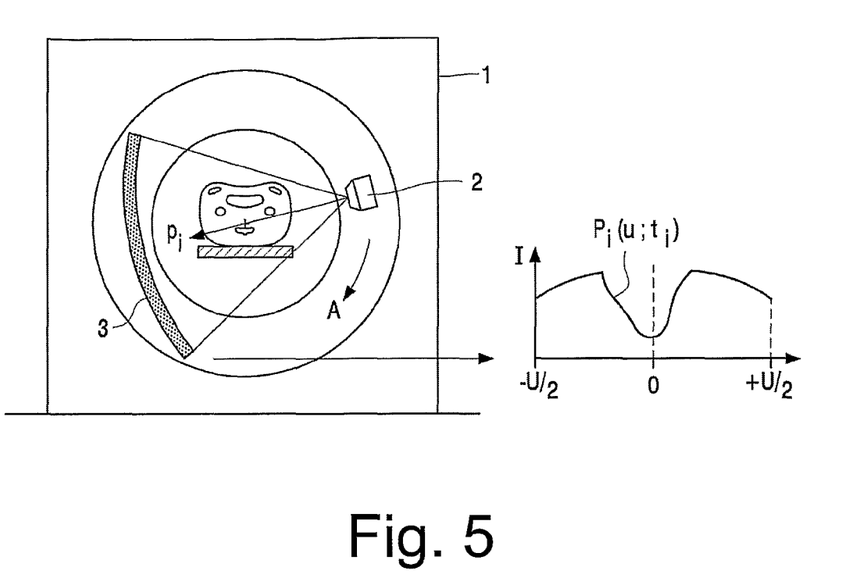
FIG. 5 is a depiction of the imaging device and the resulting projection data set at a second time instant.

In FIG. 5 the same imaging device 1 as in FIG. 4 is shown but at a later time instant $t_i$. The fixedly mounted X-ray source 2 and the detection unit 3 are rotated to a different position around the object 4. Such a rotation position can be uniquely defined by a rotation angle of the X-ray source with respect to an imaging-device fixed coordinate system that is centered in the center of rotation 6. The projection data set $P_i$ is measured at time $t_i$. The resulting measured intensity values are again depicted on the right-hand side of FIG. 5. It can be seen that for a given detector element at a position $u=u_0$ the intensity of the impinging X-rays varies over time as the relative position of X-ray tube 2 and detection unit 3 with respect to object 4 varies due to the rotation. If the detection unit has a temporal response function, it follows that the measured intensity signals are temporally deteriorated similarly to the degradation shown in FIG. 2.

Figure 8A:
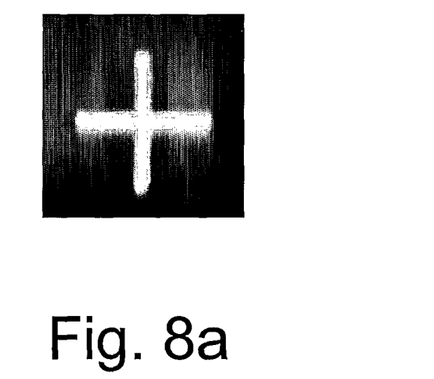
FIG. 8a shows simulation results showing the effect of a temporal behavior on an image detail.

As is known in the art, cross-sectional image data sets of the irradiated object 4 indicating spatially resolved X-ray attenuation properties of the object can be reconstructed from projection data sets covering at least a rotation angle of 180 degrees plus fan angle. For a CT scanner as shown in FIGS. 4 and 5, the angle of the X-ray fan beam 7 is about 60 degrees. Due to the temporal deterioration of the projection data sets, the resulting reconstructed cross-sectional image data sets are also deteriorated due to the temporal response function of the detection unit. As the temporal response function smoothes high frequencies in the output signal over time, contrast differences in the reconstructed image data set are smeared in the image data set in the rotation direction. An exemplary temporally degraded image detail is shown in FIG. 8a. FIG. 8a is the result of a simulation taking into account a temporal behavior. The image detail shows a cross-like aluminum structure surrounded by homogeneous matter (water). The rotation direction at this image detail was along the vertical bar from bottom to top. It can be seen that the horizontal bar of the cross structure is severely blurred due to the temporal response behavior of the detector as well as the top and bottom edge of the vertical bar. The image detail is 3 cm wide. The image detail was generated from simulations, where a single decay constant of 1 ms was assumed. It should only schematically indicate the effect of a temporal response function.

In the following the impact of the temporal filtering on the reconstructed images is estimated. For this estimation the projection data sets need to be processed as follows: prior to reconstruction the signal values representing each projection data set are normalized to a signal value acquired in the absence of the object to be imaged. This is a standard procedure known in the art. The corresponding projection data set used for normalization is denoted by $s_0(u,t)$ and is referred to as the reference projection data set. The temporal response function of the detection unit is assumed to have no effect on $s_0$ as it is assumed that the detection unit is in an equilibrium state when $s_0$ is measured. This can be achieved by prior irradiation of the detection unit before the reference projection data set is read out. Hence, $\partial s_0(u,t)/\partial t = 0$ holds and $\bar{s}_0(u,t) = s_0(u,t)$ is valid. The normalization is performed on $$\left[1 + \tau \frac{\partial}{\partial t}\right] \bar{s}(u,t) = s(u,t). \tag{2}$$

Equation 1 is a solution to equation 2 under the boundary condition that $s(u,0)=0$.

After normalization, the logarithm is taken for both sides of the normalized equation 2 and hereafter the reconstruction operation $\Re$ is applied. By denoting $b = \Re \ln(s/s_0)$ as the non-deteriorated reconstructed image and $\bar{b} = \Re \ln(\bar{s}/s_0)$ as the temporally deteriorated image data set, the difference between temporally deteriorated image and non-deteriorated image is found to be $\Delta b = b - \bar{b} = \Re \ln(1+\gamma)$, where $\gamma = \tau \partial \bar{s}/\bar{s} \partial t$. The derivative with respect to time can be rewritten as an angular derivative by introducing the angular speed $\omega := \partial \theta/\partial t$. Then $\partial/\partial t = \omega \partial/\partial \theta$ and $\gamma = \tau \omega \partial \bar{s}/\bar{s} \partial \theta$. An estimate for $\Delta b$ can directly be found if we assume that the logarithm can be linearized, i.e. $\ln(1+\gamma) \approx \gamma$. Then the difference between non-deteriorated and deteriorated image data sets results in $\Delta b \approx \tau \omega \Re \partial(\ln(\bar{s}/s_0))/\partial \theta$ by utilizing the fact that the reconstruction operation is linear and that $\partial \bar{s}/\bar{s} \partial \theta = \partial(\ln(\bar{s}/s_0))/\partial \theta$ holds. Since $\tau$ was extracted before the reconstruction operation, it is implicitly assumed that $\tau$ is a general representative of the temporal response function of the detector elements of detection unit and thus invariable for all detector elements (small deviation can actually be neglected up to a certain strength). Likewise, it was implicitly assumed that the angular velocity $\omega$ is constant with respect to time during the rotation (again, small variations can be neglected). By finally assuming that the reconstruction operation and the derivation operation can be exchanged due to their linearity, the non-deteriorated image data set b is computed to read $$\Delta b = \tau \omega \cdot \partial \bar{b}/\partial \theta = (1+f)\bar{b} = \bar{b} - c, \tag{3}$$

where f is the temporal correction filter that is applied on the temporally deteriorated image in order to determine the correction c that is then subtracted from the deteriorated image $\bar{b}$. In other words, the corrected image data set b is computed by subtracting the correction c, which is $c = -f\bar{b}$, from the deteriorated image data set $\bar{b}$. The filter f acts essentially as a derivative on the perturbed image, in a direction corresponding to the direction of the angular velocity, is essentially proportional to the time constant $\tau$ and is essentially proportional to the angular velocity $\omega$, where "essentially" means that slight variations may occur in the angular velocity during the rotation and/or in the homogeneity of the time constants over the detector, but these variations can be neglected as long as the filter operates according to their mean values.

Similarly to what has been derived above, a filter operation can be computed for the case that the temporal response function is characterized by more than one time constant. In general it is assumed that for N characterizing time constants $$R(t) = \begin{cases} \sum_{n=1}^{N} \frac{\alpha_n}{\tau_n} \cdot \exp(-t/\tau_n) & \text{for } t > 0 \\ 0 & \text{else} \end{cases} \tag{4}$$

describes the temporal response after excitation by an impulse function. The weighting coefficients are normalized so that $$\sum_{n=1}^{N} \alpha_n = 1 \text{ holds.}$$

Then, repeating the above described process, it follows that $$\sum_{n=1}^{N} \alpha_n \cdot \left(1 + \tau_n \cdot \omega \cdot \frac{\partial}{\partial \theta}\right) \bar{b}(r,\theta) = \tag{5}$$

$$\bar{b}(r,\theta) + \left(\sum_{n=1}^{N} \alpha_n \cdot \tau_n \cdot \omega \cdot \frac{\partial}{\partial \theta}\right) \bar{b}(r,\theta) = b(r,\theta)$$

is the filter operation to be applied on the uncorrected image to compute the corrected image. This can be simplified again to yield $$b = (1+f)\bar{b} = \bar{b} - c. \tag{6}$$

For an imaging device as depicted in FIG. 4 and FIG. 5 with a single-line detector with D individual detector elements, a projection data set $P_i$ is a one-dimensional vector of D measured values $P_i = (V_{1,i}, V_{2,i}, \ldots, V_{D,i})$. A plurality of such projection data sets acquired at different angles covering at least 180 degrees plus fan angle are then used for reconstruction, as is known in the art, e.g. by a filtered back-projection algorithm. From the projection data sets an image data set I is thus reconstructed. In the given embodiment, I is a matrix of N×N image data values representing the attenuation properties of the irradiated object 4 at the respective points in real space. Naturally, the image data set is not limited to an N×N matrix but could also be an N×M matrix or a non-Cartesian matrix (e.g. consisting of hexagonally distributed image values). When displayed, an image data value is also called a pixel. A pixel has a two-dimensional extension. In a Cartesian matrix, a pixel has an extension in the x-direction and an extension in the y-direction. Depending on the reconstruction procedure, the image data value may represent the attenuation property of the object at the center position of a given pixel or an average attenuation value averaged over the extension of the pixel.

Figure 6:
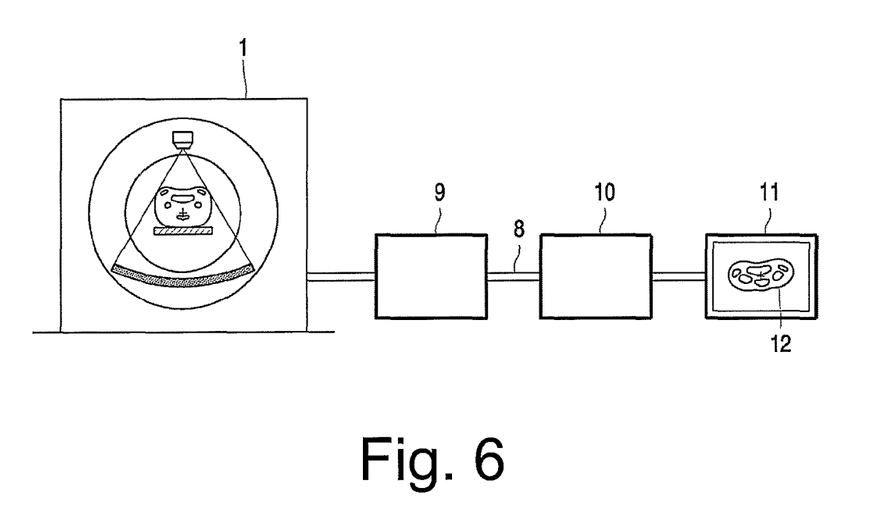
FIG. 6 is a schematic depiction of the imaging device together with the reconstruction unit, the filter unit and a display unit.

FIG. 6 schematically shows an imaging system for imaging an object that comprises the imaging device 1, a reconstruction unit 9 that reconstructs cross sectional images of the object from the projection images acquired at angularly spaced positions of the source-detector arrangement around the object, a correction unit 10, to which the described filtering is applied on the reconstructed slice image, and a display 11 on which the corrected slice image 12 of the object is shown. The correction unit 10 might be part of a processing unit of the imaging device 1 but it could also be a separate device that is coupled to the reconstruction unit 9 by means of a coupling 8, which coupling 8 could be a wired coupling or a wireless coupling. Here, wireless coupling shall include techniques like infrared connections or bluetooth connections as well as a connection via a data carrier. The latter means that a data carrier is written that carries the uncorrected slice image and that this data carrier is used to transport the information to the correction unit 10. The necessary information on rotational speed, characteristic temporal constants and the like may be known by the correction unit 10 or may be part of the information transferred to the correction unit by means of the wired or wireless coupling 8.

Figure 7:
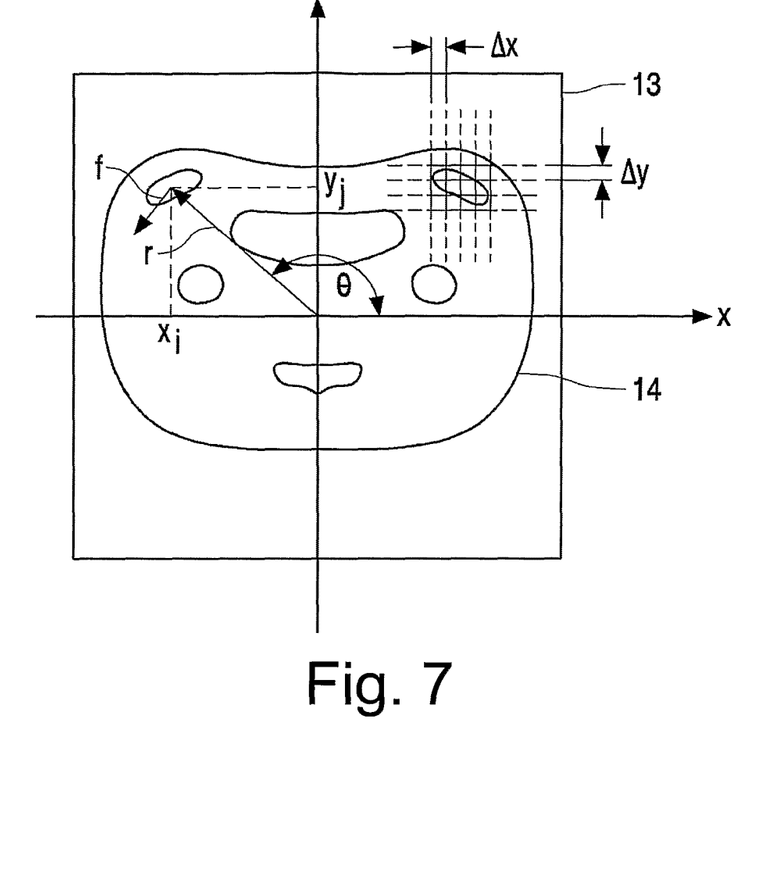
FIG. 7 is a schematic depiction of the reconstructed image data set with an indication of the filter operation.

In FIG. 7, an image data set 13 is displayed. As indicated in the top-right part of FIG. 7, the image data set consists of a Cartesian pixel matrix of image data values, where each pixel has an extension in the x-direction that is given by $\Delta x$ and an extension in the y-direction that is given by $\Delta y$. In the image data set a cross-sectional image representation of the X-ray attenuation values of the imaged object slice 14 is displayed. The temporal correction filter f is for instance applied on a pixel value at coordinates $x_i$, $y_i$ at a distance $|r|=\sqrt{(x_i^2+y_i^2)}$ to the point that corresponds to the center of rotation of the CT system. The relative angle of the vector r with respect to the x-axis of the Cartesian coordinate system is denoted by $\theta$. Here, the x and y axis of the image coordinate system are chosen so that they coincide with the coordinate system in real space, so that the center of rotation coincides with the origin of the image coordinate system.

In order to apply the general temporal filter f that has been derived above on a Cartesian image value matrix, the filter operation according to equation 3 is discretized and the overall correction formula reads $$b(n, m) = \overline{b}(n, m) + \tau\omega\left[n \cdot \Delta x \cdot \frac{\overline{b}(n, m) - \overline{b}(n, m-1)}{\Delta y} - m \cdot \Delta y \cdot \frac{\overline{b}(n, m) - \overline{b}(n-1, m)}{\Delta x}\right], \quad (7)$$

where n and m indicate the image data value in a (2N+1)×(2M+1) image data set at position n and m, where $-N \leq n \leq N$ and $-M \leq m \leq M$, and b(0,0) is the center pixel. Here, $|r|=\sqrt{(n\Delta x)^2+(m\Delta y)^2}$. If an even pixel matrix were used, a similar equation could be derived and it would also be possible to derive a formula for a pixel matrix other than a Cartesian pixel matrix. It depends on the implementation whether the correction is computed for each pixel value and is then subtracted from the deteriorated image pixel value or the correction is computed for all pixels to generate a correction image and is then subtracted from the deteriorated image.

Figure 8B:
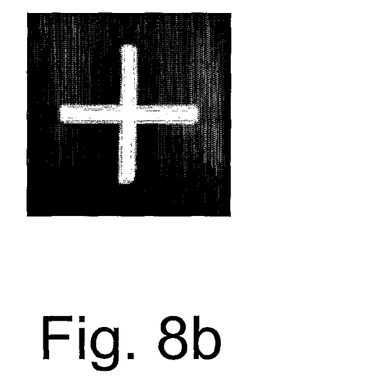
FIG. 8b shows simulation results showing the same image detail as in FIG. 8a but after the inventive correction scheme has been applied.

FIG. 8b shows the same detail as in FIG. 8a but after the filter f for correction of the temporal response function according to equation 7 has been applied. The contour of the aluminum cross is essentially restored.

This shows that a temporal correction filter has been derived that can be applied on the image instead of on the projection data sets. One of the advantages of being able to apply a filter on the image is that it is no longer necessary to store previous signal values. Applying a filter on a projection data set requires the storage of the intensity values of the previous projection data set in order to apply the recursive filter operation as known from U.S. Pat. No. 5,249,123. Furthermore, the number of image pixels is typically smaller (e.g. 512×512) than the number of projection data values that need to be corrected (e.g. 1000 detector elements×2000 acquisitions per rotation). For the given values, this means a reduction of the correction operations by a factor of eight. Since the filter is applied to a reconstructed image, it can be used independently of the availability of sinogram data, or, in other words, this makes the correction scanner independent!

The concept as described is also valid for images generated with a spiral scanning technique as long as the interpolations used can be exchanged with the integral of equation 1. This is e.g. the case for linear or bilinear interpolation.

The characteristic time constant (or the set of characteristic time constants) can be determined in various ways. A first way would be the illumination of the detector with short pulses and the measurement of the temporal response of the detector with a high temporal resolution. A standard fit procedure could then be used to determine the characteristic time constant. In a second way, one or more known reference objects are imaged. Then, e.g. by comparison with the ideal signal response that can be computed e.g. by way of simulation, the measured signals can be compared with the ideal signals and the characteristic time constant can be determined.

The invention claimed is:

1. Imaging system for imaging an object that comprises
a detection unit for consecutively acquiring projection data sets of the object, said detection unit having a temporal response function that is characterized by at least a time constant,
a rotation unit that, while the projection data sets are being acquired, moves the detection unit around the object with an essentially constant angular velocity,
a reconstruction unit for computing an image data set of the object from the projection data sets, and
a filter unit that, in an active state, applies a filter on the image data set to compute a correction, wherein the filter acts essentially as a derivative on the perturbed image, in a direction corresponding to the direction of the angular velocity,
is essentially proportional to the time constant and
is essentially proportional to the angular velocity, said filter unit being arranged to subtract the correction from the image data set.

2. Imaging system according to claim 1, wherein the detection unit is an X-ray detector having at least one conversion layer that causes the temporal response function.

3. Imaging system according to claim 1, wherein the temporal response function is characterized by two or more time constants and that the filter is a weighted sum over filter terms that each represent the filter for the respective time constants.

4. Imaging system according to claim 1, wherein the filter unit is remote from the other components of the imaging device and that it receives the image data set by a wireless connection.

5. Method of correcting for temporal artifacts in an image data set of an object comprising the steps of consecutively acquiring projection data sets at different angular positions around the object, where the change in angular position occurs with essentially a constant angular velocity, said projection data sets being deteriorated by a temporal response function which is characterized by at least one time constant, determination of the image data set from the projection data sets by means of a reconstruction operation, applying a filter on the image data set to compute a correction, wherein the filter acts essentially as a derivative on the perturbed image, in a direction corresponding to the direction of the angular velocity, is essentially proportional to the time constant and is essentially proportional to the angular velocity, subtracting the correction from the image data set.

6. A computer storage medium comprises a software program for correcting temporal artifacts in an image data set, said software program perform the method according to claim 5 on an image data set when loaded into a processing device.

* * * * *